United States Patent
Sirov

(10) Patent No.: US 11,550,563 B2
(45) Date of Patent: Jan. 10, 2023

(54) REMOTE DETECTION OF DEVICE UPDATES

(71) Applicant: VEEGO SOFTWARE LTD., Ramat Gan (IL)

(72) Inventor: Denis Sirov, Tel Aviv (IL)

(73) Assignee: VEEGO SOFTWARE LTD., Tel Aviv (IL)

( * ) Notice: Subject to any disclaimer, the term of this patent is extended or adjusted under 35 U.S.C. 154(b) by 0 days.

(21) Appl. No.: 17/352,441

(22) Filed: Jun. 21, 2021

(65) Prior Publication Data

US 2021/0397438 A1 Dec. 23, 2021

Related U.S. Application Data

(60) Provisional application No. 63/041,941, filed on Jun. 21, 2020.

(51) Int. Cl.
| | |
|---|---|
| *G06F 8/65* | (2018.01) |
| *H04L 12/28* | (2006.01) |
| *H04L 9/40* | (2022.01) |
| *H04L 67/00* | (2022.01) |

(52) U.S. Cl.
CPC ............ *G06F 8/65* (2013.01); *H04L 12/2834* (2013.01); *H04L 63/0823* (2013.01); *H04L 67/34* (2013.01)

(58) Field of Classification Search
CPC ....... G06F 8/65; G06F 21/57; H04L 12/2834; H04L 63/0823; H04L 67/34; H04L 63/145; H04L 63/123
See application file for complete search history.

(56) References Cited

U.S. PATENT DOCUMENTS

| | | | |
|---|---|---|---|
| 8,762,467 | B2 | 6/2014 | Virani |
| 8,955,038 | B2* | 2/2015 | Nicodemus ......... G06F 21/6218 717/172 |
| 2003/0198214 | A1 | 10/2003 | Tsukakoshi |
| 2009/0150972 | A1 | 6/2009 | Moon |
| 2014/0258509 | A1* | 9/2014 | Raghuraman ........... H04L 41/14 709/224 |
| 2014/0283065 | A1* | 9/2014 | Teddy ................... H04L 63/145 726/23 |
| 2016/0218942 | A1* | 7/2016 | Choquette ........... H04L 43/0811 |
| 2017/0155703 | A1* | 6/2017 | Hao ........................ H04W 4/70 |
| 2020/0177444 | A1* | 6/2020 | Nelson-Gal ............ H04L 67/56 |

\* cited by examiner

*Primary Examiner* — Marina Lee
(74) *Attorney, Agent, or Firm* — The Roy Gross Law Firm, LLC; Roy Gross

(57) ABSTRACT

A method comprising: identifying, by a cloud server, a set of local area networks (LAN) associated with the cloud server, based on a similarity parameter with respect to an end device connected within each of the LANs; forming a communications network comprising all of the LANs in the set; detecting, by at least a subset of the LANs, a download file received by the respective end devices in each of the LANs in the subset; calculating an update event likelihood score with respect to the download file, based, at least in part, on a plurality of parameters associated with the download file; and issuing, by at least one of the LANs in the subset, a notification that the download file is associated with an update event affecting all of the end devices in each of the LANs, when the update event likelihood score exceeds a specified threshold.

20 Claims, 6 Drawing Sheets

REMOTE DETECTION OF DEVICE UPDATES

CROSS-REFERENCE TO RELATED APPLICATIONS

This Application claims the benefit of priority U.S. Provisional Patent Application No. 63/041,941, filed Jun. 21, 2020, the content of which is incorporated by reference herein in its entirety.

FIELD OF THE INVENTION

The invention relates to the field of computer network security.

BACKGROUND OF THE INVENTION

Most connected devices undergo a continual revision process to repair or update features of installed software. Each software revision requires adding new files, replacing existing files with newer revisions, deleting obsolete files, or various combinations of these actions. The process of replacing older files, adding new files, and deleting obsolete files of a software product is usually referred to as "updating the product" or "software update."

Connected devices often implement functionality that may be disrupted due to a software update. For example, following a software update, a smart speaker may no longer be compatible with a connected smart TV, because of a change in an API of the smart speaker.

Therefore it may be advantageous, for technical support and diagnostic purposes, to be able to identify the occurrence of a software update of connected devices.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: identify, by a cloud server, a set of local area networks (LAN) associated with the cloud server, based, at least in part, on a similarity parameter with respect to a respective end device connected within each of the LANs, form a communications network comprising all of the LANs in the set, detect, by at least a subset of the LANs in the set, a download file received by the respective end devices in each of the LANs in the subset, calculate an update event likelihood score with respect to the download file, based, at least in part, on a plurality of parameters associated with the download file, and issue, by at least one of the LANs in the subset, a notification that the download file is associated with an update event affecting all of the end devices in each of the LANs, when the update event likelihood score exceeds a specified threshold.

There is also provided, in an embodiment, a computer-implemented method comprising: identifying, by a cloud server, a set of local area networks (LAN) associated with the cloud server, based, at least in part, on a similarity parameter with respect to a respective end device connected within each of the LANs; forming a communications network comprising all of the LANs in the set; detecting, by at least a subset of the LANs in the set, a download file received by the respective end devices in each of the LANs in the subset; calculating an update event likelihood score with respect to the download file, based, at least in part, on a plurality of parameters associated with the download file; and issuing, by at least one of the LANs in the subset, a notification that the download file is associated with an update event affecting all of the end devices in each of the LANs, when the update event likelihood score exceeds a specified threshold.

There is provided, in an embodiment, a computer program product comprising a non-transitory computer-readable storage medium having program instructions embodied therewith, the program instructions executable by at least one hardware processor to: identify, by a cloud server, a set of local area networks (LAN) associated with the cloud server, based, at least in part, on a similarity parameter with respect to a respective end device connected within each of the LANs; form a communications network comprising all of the LANs in the set; detect, by at least a subset of the LANs in the set, a download file received by the respective end devices in each of the LANs in the subset; calculate an update event likelihood score with respect to the download file, based, at least in part, on a plurality of parameters associated with the download file; and issue, by at least one of the LANs in the subset, a notification that the download file is associated with an update event affecting all of the end devices in each of the LANs, when the update event likelihood score exceeds a specified threshold.

In some embodiments, the program instructions are further executable to determine, and the method further comprises determining, that the download file is not associated with an update event, based, at least in part, on detecting that the download file is part of: a streaming service, and a peer-to-peer file sharing service.

In some embodiments, the plurality of parameters comprise: a size of the download file; a type of the download file; a time of day of the receiving by the respective end devices; an encryption status of the download file; the presence of a digital certificate and server identify associated therewith or a digital signature associated with the download file; a number of the respective end devices which received the download file; a degree of similarity among all of the end devices which received the download file; a reboot event experienced by at least some of the respective end devices which received the download file; a domain name of a source form which the download file is received; at least one of mean, minimum, maximum, variance, and distribution of the number of downloaded files received from a specified IP address; and at least one of mean, minimum, maximum, variance, and distribution of the sizes of downloaded files received from a specified IP address.

In some embodiments, the similarity parameter is at least one of: end device type; end device model; end device manufacturer; end device product version; end device build version; one or more end device components; one or more end device sub-components; an installed software on the end device or a specified version thereof; an operating system of the end device or a specified version thereof; a firmware of the end device or a specified version thereof; one or more end device user attributes; and end device geographic location.

In some embodiments, each of the LANs comprises a gateway device, and wherein the forming, detecting, calculating, and notifying are performed by the respective gateway devices.

In some embodiments, the communications network includes the cloud server, and wherein the notifying comprises notifying the cloud server.

In some embodiments, the update event comprises a set of changes to a computer program residing on the end device.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Disclosed herein is a technique, embodied in a system, method, and computer program product, which provide for a simple and efficient protocol for diagnosing, detecting and/or authenticating an update event with respect to a computer program installed on a connected device.

In some embodiments, the present disclosure provides for a method of update-event diagnostics with respect to a remote connected device, to, e.g., detect and/or verify the occurrence on the update event, minimize disruption of service to the user, and/or assist in technical support and/or troubleshooting.

Over-the-air programming refers to various methods of distributing new software, configuration settings, and/or updates to devices such as mobile phones, smart appliances, and set-top boxes. These methods typically implement automated updates deployment to remotely-located devices over a network, such as the Internet and/or a local network. This enables a vendor to push updates to devices, which typically are programmed to accept and accommodate updates. Software updates may include security updates, anti-virus software, operating system updates, and the like. Such facility in software updating helps to reduce the amount of time and labor needed to execute the updating and helps to prevent update errors and ensure that updates occur on a regular basis.

Figure 1:
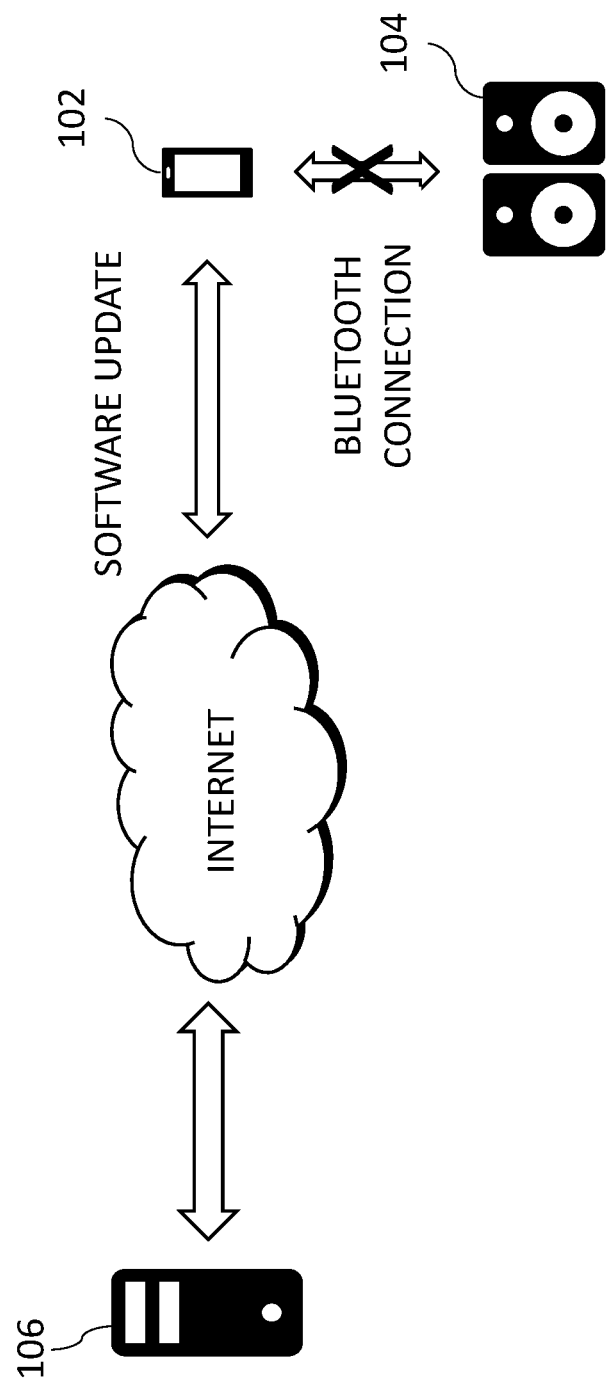
FIG. 1 shows connected devices receiving an update to software installed thereon.

As can be seen in FIG. 1, connected devices (e.g., devices connected with one another and/or within a local area network over wi-fi), such as smartphone 102 often receive an update to the software installed thereon (e.g., an operating system) from a remote server 106 via the Internet. Often Software updates are received by a connected device in the form of a download file that self-deploys and/or requires user authorization to deploy. Software updates may be pushed to the device, e.g., by a maker of the device and/or a third party vendor of a software installed do the device.

In some instances, a software or firmware update to a connected device may result in loss and/or disruption of service, e.g., between smartphone 102 and Bluetooth speakers 104. For example, some issues relate to connectivity and/or compatibility between the user's device and a third-party device. Such issues may arise after a software update is downloaded and result in a poor user experience. In some cases, an update may cause loss of connectivity and/or similar functionality between the device and another device, e.g., within the same local area network. For example, a smart speaker may lose connectivity with a smart TV after experiencing a software update. In some cases, a poor user experience comprises one or more of loss of connectivity between devices, slow and/or sluggish connectivity, re-occurring reboots of a device, and the like.

Accordingly, a potential advantage of the present disclosure may be to enable update event diagnostics with respect to a device, which may assist in determining a cause of device malfunction, e.g., in the context of a technical support request.

Wireless access is the predominant means for devices to communicate within home and public networks, such as wi-fi hotspots. The inherent variability in the quality of service (QoS) achieved by various wireless end-devices drives many complaints to network internet service providers (ISPs). In turn, the QoS of the final network segment has a significant effect on the quality of experience (QoE). For ISPs, the performance of the home or residential network is a particular problem, because it is largely beyond the control of, and invisible to, the ISPs, although it may be the ultimate cause of a large number of calls to ISP helplines.

For example, connectivity issues within a home network caused by, e.g., loss of compatibility after an update event, may generate a large volume of service calls. For example, as seen in FIG. 1, after smartphone 102 undergoes a software update, it may no longer connect to speaker 104 with which there were no connectivity issues prior to the software update. However, generally, ISPs are not able to detect an update status of a device, e.g., whether there has been a recent update event, to assist in diagnosing the cause of the problem.

In other cases, it would be beneficial to ascertain a provenance of a received download file by a device, when the file purports and/or appears to be a software update and/or upgrade. For example, a device has no means to ascertain whether a received download file may be authentic or malicious. Without the ability to authenticate a downloaded file, malware may be deployed to devices, which may cause disruption and damage, and/or gain unauthorized access to a device.

Therefore, providing a means to monitor an update status of a device within a home network can assist in highlighting when a customer problem is due to an update event with respect to a device (as opposed to a broadband or access network or access network congestion, for example), and provide information to end-users and/or ISPs to inform them of potential problems. In some embodiments, such diagnostic ability may be applicable in relation to the monitoring of wired as well as wireless devices.

In some embodiments, the present disclosure is based on the notion that similar and/or similarly situated devices may experience an update event concurrently, at or about the same time and/or within a defined time period. For example, it would be expected that similar and/or similarly-situated devices may receive updates to their software at or around similar times, such as in the case of a smartphone maker which may deploy a software update to all smartphones running a similar operating system.

While a single device may not have the ability to authenticate and/or identify a software update file. However, if a plurality of similar devices can be assembled into a communicative network, it is possible to identify a number of devices that received a similar file/software update. Upon a minimum number of devices within the network being identified as receiving the software update, it can be inferred that a software update event has been effected with respect to all similar and/or similarly-situated devices.

Accordingly, in some embodiments, the present disclosure provides for a method which enables detection and/or authentication of an update event, based, at least in part, on forming an ad-hoc computer network comprising a plurality of similar and/or similarly-situated connected devices. In some embodiments, the ad-hoc network of devices may be based on a client-server model; a peer-to-peer model (P2P) where the devices act as clients and server without a central server; a hybrid P2P network; or a mixed P2P network.

Thus, in order the determine a provenance of a suspected update event, a network of similar devices may be configured for automatically polling nodes of the network to ascertain the occurrence of an update event with respect to at least some of the nodes. In some embodiments, when an occurrence of an update event has been detected with respect to at least a threshold proportion of network nodes, it may serve as an indication of an occurrence of the update event with respect to all network nodes. By way of a consensus, a subset of gateways can authentic files that are received. Accordingly, in some embodiments, the detection and/or authentication is based on a consensus polling of connected devices in the network, to assess a likelihood of a software update event occurring with respect to at least some of the devices in the network.

In some embodiments, additional and/or other criteria may be used for detecting an update event including, but not limited to, a reboot event of a device within a specified time of downloading a file and/or for a specified duration of time; minimum download file size; specified download file size range; download file time of day; a time range within which a download file is received by each of the devices; a specified combination of download file size and download time of day; and/or an encryption status of the download file.

In some embodiments, the present disclosure further provides for detecting and/or determining and/or classifying a type and/or category of service associated with the downloaded file. For example, the present disclosure provides for detecting whether a common downloaded file among the connected device in the ad-hoc network is in fact a shared resource accessed by multiple devices in the network, such as a streaming service, e.g., a video streaming service, or a peer-to-peer file sharing service.

In some embodiments, an 'update event' may refer to any update, upgrade, and/or any other type of patch, i.e., a set of changes to a computer program or its supporting data designed to repair and/or improve the functionality, usability or performance of the program. In some embodiments, the program being updated may be software, firmware, operating system, application, and/or any other type of computer program residing on a device.

In some embodiments, a connected device of the present disclosure may be any one of a smartphone, a tablet, a desktop computer, a smart speaker, a smart TV, and/or any Internet-of-things (IoT) appliance.

In some embodiments, the present disclosure operates within the context of a plurality of local area networks (LAN), each comprising one or more end user devices (such as a tablet, a desktop computer, a smartphone, a smart TV, etc.). Each of the LANs may be connected to the Internet through an access point and/or a gateway, such as a broadband modem and/or router. LANs and/or WLANs, as described herein, may include wired or wireless client devices connected through a wired or gateway or router. The LAN/WLAN may be connected with the access network via a broadband modem.

In a typical LAN environment, a user may access the Internet by connecting a client device (which may be a wireless device) to a server on the Internet, via intermediate devices and networks. In some implementations, a client device may be connected to a local area network, which is configured to communicate with servers on a wide area network (e.g., the Internet) via an access network. The LAN, which may be a wireless local area network (WLAN) may include, e.g., wired and/or wireless client devices connected to the LAN through an access point (e.g., a wireless router). The LAN may be connected with the access network via a gateway. The wide area network may include servers, such as authentication servers, web servers, electronic messaging servers, etc., accessible to the client device. In some embodiments, the connected devices within the LAN, can be, but are not limited to, a tablet, a desktop computer, a laptop computer, a handheld computer, a cellular telephone, a smartphone, a network appliance, a camera, a media player, a navigation device, a game console, or a combination of any these data processing devices or other data processing devices.

The wide area network (WAN) may include servers, such as authentication servers, web servers, electronic messaging servers, etc., accessible to the client device. In some embodiments, a wide area network can include, but is not limited to, a large computer network that covers a broad area (e.g., across metropolitan, regional, national or international boundaries), for example, the Internet, a private network, a cellular network, or a combination thereof connecting any number of mobile clients, fixed clients, and servers.

In some embodiments, a set of similar and/or similarly-situated devices may be identified within a plurality of LANs. In some embodiments, identifying a set of similar device may be performed, e.g., through a process administered by a service provider, e.g., an ISP, over cloud access. Accordingly, in some embodiments, the LANs may all comprise LANs served by a common ISP and/or another service provider.

In some embodiments, a cloud-based server may be operated by a service provider and/or vendor associated with a plurality of connected devices, wherein each may operate in the context of a LAN. In some embodiments, the cloud server may be operated by a service provider which may provide a common service to the plurality of LANs, e.g., an ISP. In some embodiments, the cloud server may be operated by a third-party vendor, which may be provided with access to the LANs through, e.g., a software agent installed on a gateway and/or access device of each LAN. In some embodiments, an end user may initiate an association with a cloud-based service for this purpose by, e.g., accessing a designated website (e.g., using a link provided by a user's ISP) and/or accessing a dedicated application. From within the website and/or application, the user may establish an association between the cloud-based service and the end-device. In some embodiments, the designated website may be hosted on remote and/or cloud server, which may be operated by an ISP and/or by any other service provider.

Figure 2:
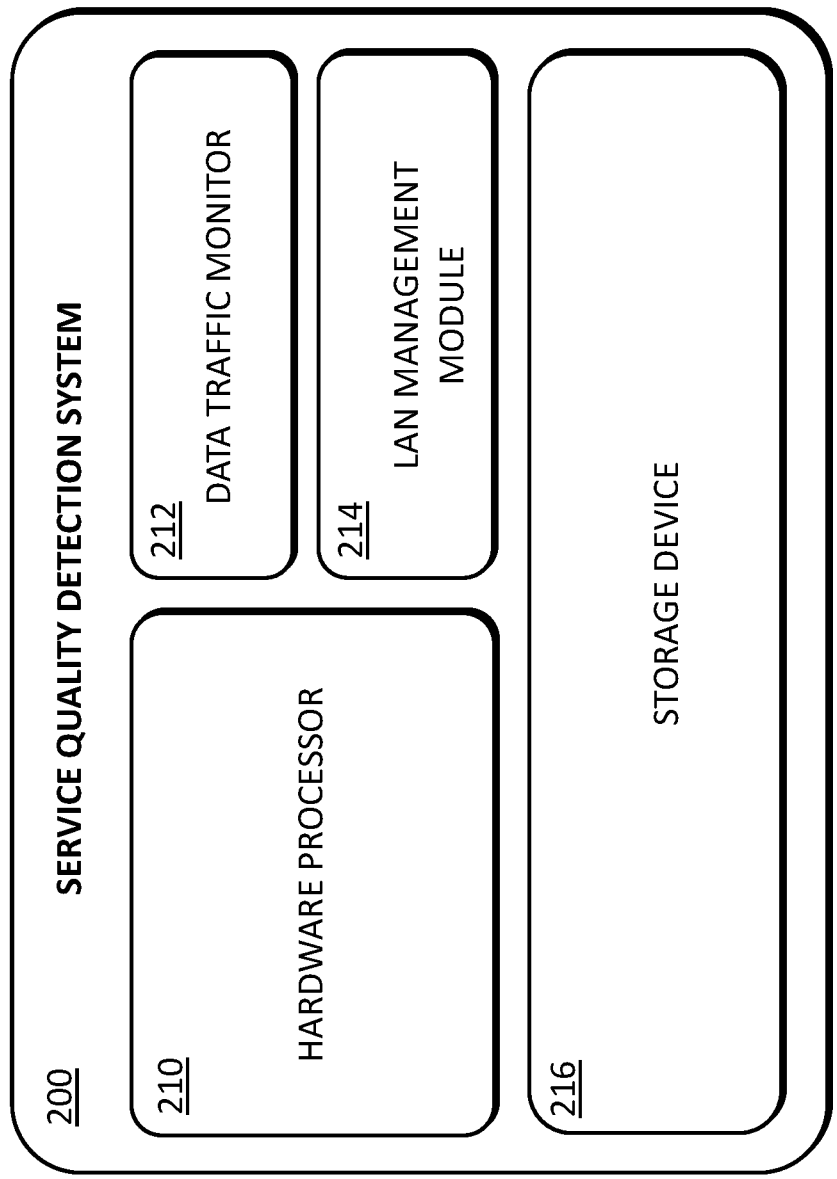
FIG. 2 shows a block diagram of an exemplary system configured to diagnose, detect and/or authenticate an update event with respect to a computer program installed on a connected device, in accordance with various aspects of the present disclosure.

FIG. 2 shows a block diagram of an exemplary system 200 configured to diagnose, detect and/or authenticate an update event with respect to a computer program installed on a connected device, in accordance with various aspects of the present disclosure.

In some embodiments, system 200 may include a hardware processor 210, a network traffic monitor 212, a LAN management module 214, and a storage device 216 comprising a random-access memory (RAM) and one or more non-transitory computer-readable storage device. Each of these components may be in communication with each other.

System 200 as described herein is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown).

In some embodiments, system 200 may be operated in the context of a cloud-based server, which may be operated by a service provider and/or vendor associated with a plurality of connected devices, wherein each may operate in the context of a LAN. However, components of system 200 may be co-located or distributed, or the system may be configured to run as one or more cloud computing "instances,' 'containers,' 'virtual machines,' or other types of encapsulated software applications, as known in the art.

Storage device 216 may have stored thereon program instructions and/or components configured to operate hardware processor 210. The program instructions may include one or more software modules, such as network traffic monitor 212 and/or LAN management module 214. The software components may include an operating system having various software components and/or drivers for controlling and managing general system tasks (e.g., memory management, storage device control, power management, etc.), and facilitating communication between various hardware and software components.

Network traffic monitor 212 may be configured to continuously monitor data traffic over one or more data communication networks, e.g., a plurality of remote LANs to detect one or more update events with respect to a computer program installed on one or more connected devices.

LAN management module 214 may be configured to manage a plurality of remote LANs, such as residential, office, school, public, and/or similar networks. Each LAN may comprise one or more end-user connected devices (such as a tablet, a desktop computer, a smartphone, a smart TV, etc.). Each of the LANs may be connected to the Internet through an access point and/or a gateway, such as a broadband modem and/or router. In some embodiments, LAN management module 214 may be configured to form and manage an ad-hoc networks comprising a plurality of LANs. In some embodiments, the ad-hoc network may be based on a client-server model; a peer-to-peer model (P2P) where the devices act as clients and server without a central server; a hybrid P2P network; or a mixed P2P network.

Figure 3A:
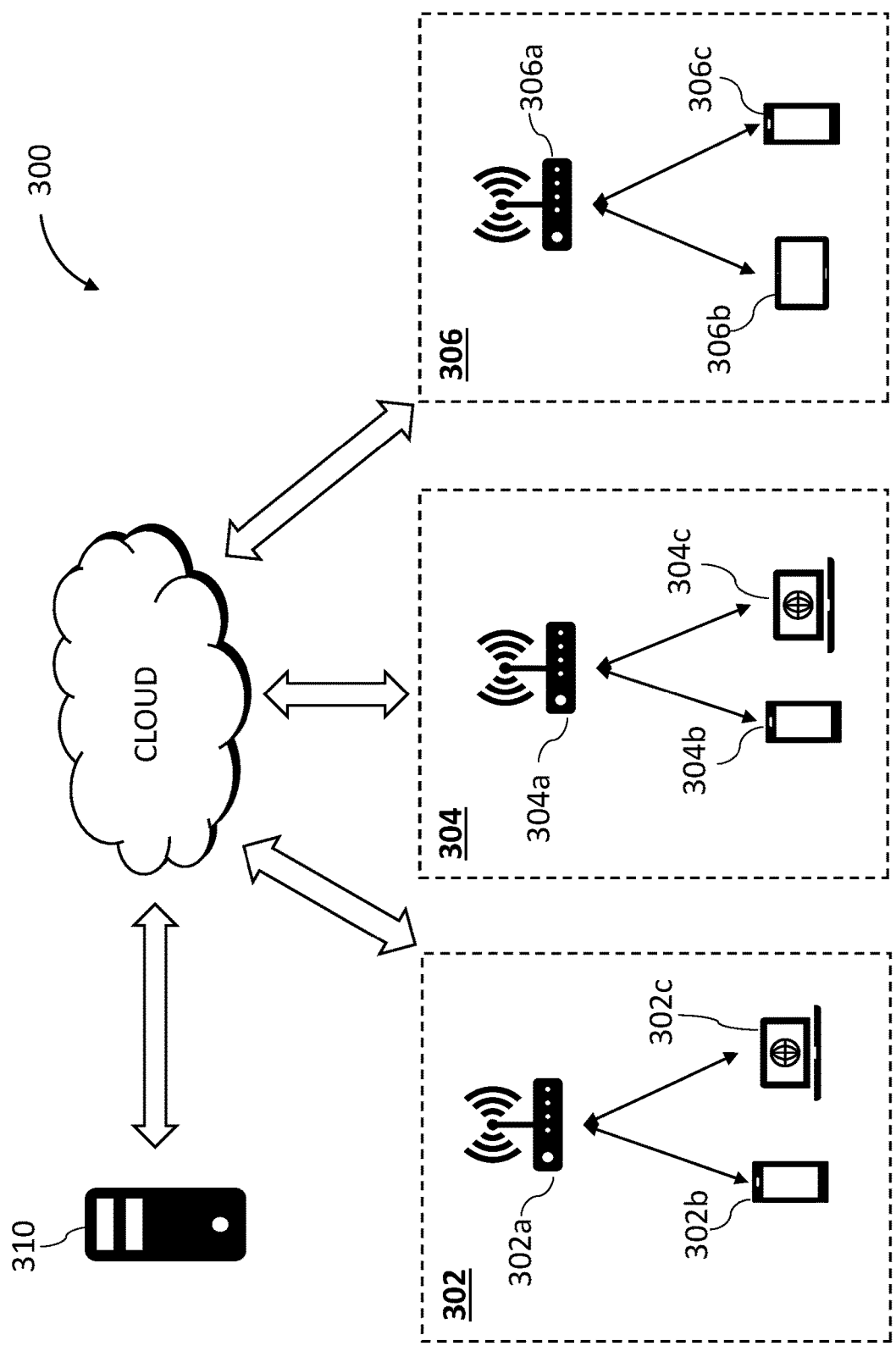
FIGS. 3A-3C illustrate an exemplary network environment which provides for update event diagnostics with respect to end device within the network, according to some embodiments of the present invention.

FIG. 3A illustrates an exemplary network environment 300 which provides for update event diagnostics with respect to end devices within the network, in accordance with various aspects of the present disclosure.

Network environment 300 is only an exemplary environment, and the present disclosure may operate within other computer network environments comprising more or fewer components than shown, combining two or more of the components, or having a different configuration or arrangement of the components. The various components of network environment 300 may be implemented in hardware, software or a combination of both hardware and software. In various embodiments, network environment 300 may comprise one or more dedicated hardware devices, or may form an addition to or an extension of existing devices. Various components of network environment 300 may store software instructions or components configured to operate hardware processors. In some embodiments, the software components may include an operating system, including various software components and/or drivers for controlling and managing general system tasks (e.g., memory management, storage device control, power management, etc.) and facilitating communication between various hardware and software components.

In some embodiments, Network environment 300 includes LANs 302, 304 and 306 communicably connected to cloud-based server 310 via gateways 302a, 304a, 306a, respectively. LANs 302, 304, 306 comprise end devices, e.g., 302b, 302c, 304b, 304c, and 306b, 306c. In some embodiments, network environment 300 may be, e.g., a network of LANs services by a specified ISP or service provider, comprising a large number of LANs, e.g., thousands or even tens of thousands.

Each of LANs 302-306 can include a computer network that covers a limited geographic area (e.g., a home, school, computer laboratory, or office building) using a wired and/or wireless distribution method. Wired and/or wireless client devices (e.g., end devices or end devices 302b, 302c, 304b, 304c, 306b, and 306c) may associate with a gateway (e.g., gateway 302a-306a) to local area networks 302-306 using, e.g., wi-fi standards. For exemplary purposes, local area networks 302-306 are illustrated as including multiple end devices 302b, 302c, 304b, 304c, 306b, and 306c; however, local area networks 302-306 may include only one of end devices 302b, 302c, 304b, 304c, 306b, and 306c and/or local area networks 302-306 may include two or more duplicate of end devices 302b, 302c, 304b, 304c, 306b, and 306c. In some implementations, local area networks 302-306 may be, or may include, one or more of a bus network, a star network, a ring network, a relay network, a mesh network, a star-bus network, a tree or hierarchical network, and the like.

Each of end devices or end devices 302b, 302c, 304b, 304c, 306b, and 306c can represent various forms of end devices. Example processing devices can include a desktop computer, a laptop computer, a handheld computer, a tablet, a cellular telephone, a smartphone, a network appliance, a camera, a media player, a navigation device, a game console, or a combination of any these data processing devices or other data processing devices. In some aspects, end devices may communicate wirelessly through a communication interface (not shown), which may include digital signal processing circuitry where necessary. The communication interface may provide for communications under various modes or protocols, for example, short-range communication protocols such as Bluetooth, wi-fi, and the like. Other communication protocols may include Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others.

In some embodiments, system 200 in FIG. 2 may be implemented as a cloud-based server 310, which may be a system or device having a processor, a memory, and communications capability for providing content and/or services to the end devices. In some embodiments, server 310 may one or more, or all, of the components of system 200 described with reference to FIG. 2. In some example aspects, server 310 can be a single computing device, for example, a computer server. Further, server 310 can represent various forms of server including, but not limited to an application server, a proxy server, a network server, an authentication server, an electronic messaging server, a content server, a server farm, etc., accessible to end devices 302b, 302c, 304b, 304c, 306b, and 306c and gateways 302a-306a.

Gateways 302a-306a may interact with content and/or services provided by server 310, through a client application installed at gateways 302a-306a. Communication between gateways 302a-306a and server 310 may be facilitated though local area networks 302-306, an access network, and/or a wide area network. Gateways 302a-306a can include a network-connectable device, such as a hub, a router, a switch, a bridge, or an access point. The network-connectable devices may also be a combination of devices, such as a wi-fi router that can include a combination of a router, a switch, and a gateway. Other network-connectable devices can also be utilized in implementations of the present technology. Gateways 302a-306a can allow wireless client devices (e.g., end devices 302b, 302c, 304b, 304c, 306b, and 306c) to connect to a wide area network via an access network.

Figure 4:
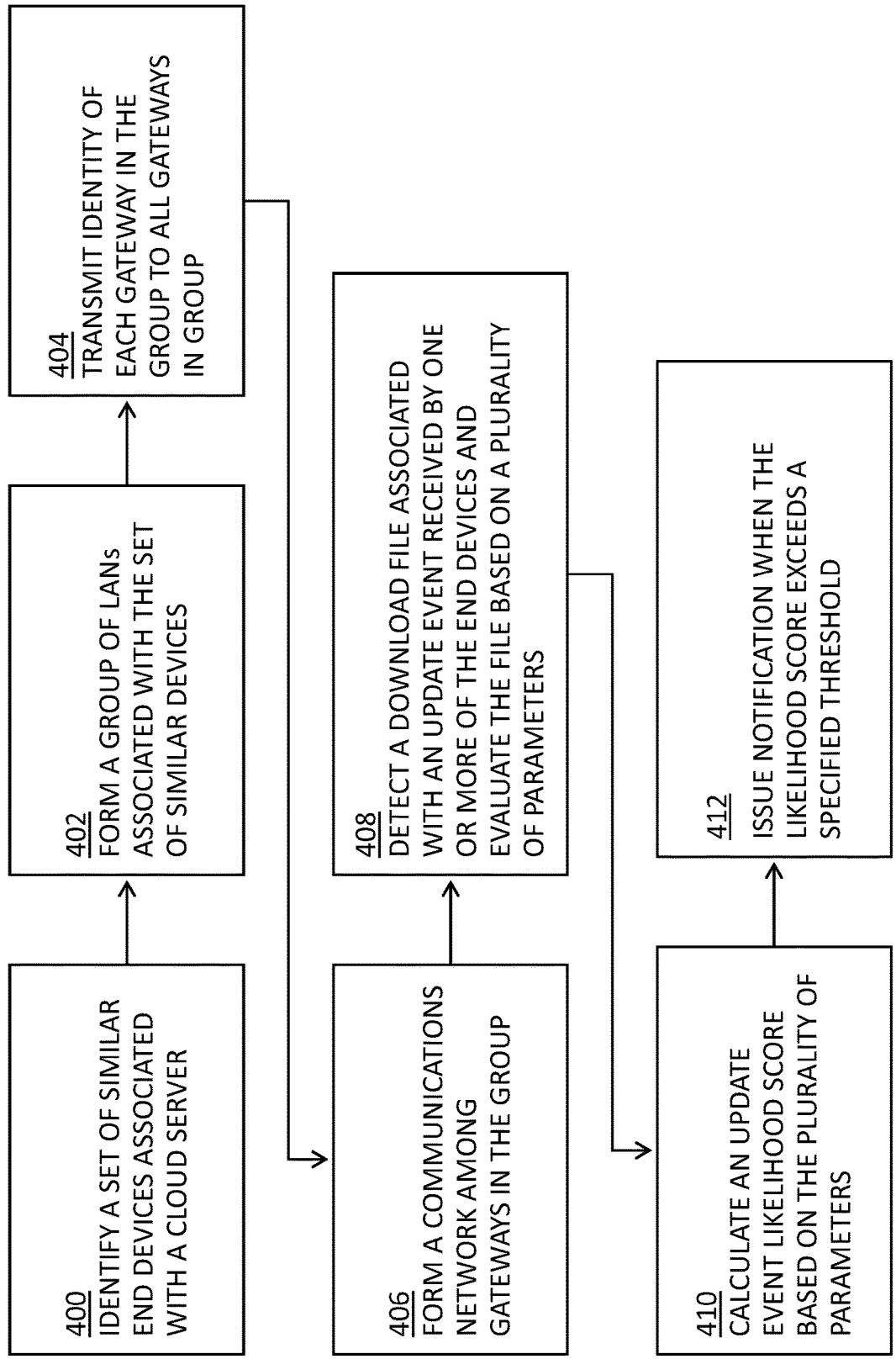
FIG. 4 is a flowchart of the functional steps in a process for update event diagnostics, in accordance with some embodiments of the present invention.

The instructions of network traffic monitor 212 and/or LAN management module 214 are now discussed with reference to the FIG. 4, which is a flowchart of the functional steps in a process for diagnosing, detecting and/or authenticating an update event with respect to a computer program installed on a connected device, in accordance with some embodiments of the present disclosure.

With continued reference to system 200 in FIG. 2 and network environment 300 in FIG. 3A, in step 400, a plurality of end devices 302b, 302c, 304b, 304c, 306b, 306c are connected as end devices in the context of respective LANs 302, 304, 306. In some embodiments, the end devices are connected to a wide area network (e.g., the Internet) directly, via an access network, or through LANs 302, 304, 306. In some embodiments, LANs 302, 304, 306 are connected to a wide area network (e.g., the Internet) directly, via an access network.

In some embodiments, a cloud-based server 310 is associated with a plurality of end devices, wherein each of the end devices may be directly associated with server 310 or through a respective LAN environment. In some embodiments, each of devices 302b, 302c, 304b, 304c, 306b, 306c may be associated with server 310 directly, through an access network, through LANs 302, 304, 306, or through cloud access.

In some embodiments, server 310 is associated with the end devices through their respective LAN environments, e.g., through a diagnostic agent software installed on gateways 302a, 304a, 306a. In some embodiments, server 310 is configured to obtain information with respect to the end devices associated therewith.

In this example, system 200 may be operated in the context of a cloud-based server such as server 310, which may be operated by a service provider and/or vendor associated with a plurality of connected devices, wherein each may operate in the context of a LAN In some embodiments, the instructions of LAN management module 214 may cause system 200 to identify a subset of end devices from those associated therewith, e.g. smartphones 302b, 304b, 306b, that are similar and or similarly-situated, based on one or more similarity parameters. In some embodiments, similarity parameters may include, but are not limited to, device type; model; manufacturer; product version; build version; one or more device components and/or sub-components; installed software, programs, and/or applications; user attributes; geographic location.

In some embodiments, end device similarity may be determined based on, e.g., a device fingerprint generated by a gateway associated with the end device. Accordingly, in some embodiments, each of gateways 302a, 304a, 306a may be configured to analyze connected devices 302b, 302c, 304b, 304c, 306b, 306c to generate a fingerprint thereof. In some embodiments, a fingerprint generated by gateways 302a, 304a, 306a may be based on one or more of device type; model; manufacturer; product version; build version; one or more device components and/or sub-components; installed software, programs, and/or applications; user attributes; geographic location.

In some embodiments, gateways 302a, 304a, 306a communicate with system 200 (implemented as server 310) to transmit fingerprints of devices connected therethrough. In some embodiments, system 200 (implemented as server 310) determines the subset of similar and/or similarly situated end devices based, at least in part, on device fingerprint.

In some embodiments, each gateway 302a, 304a, 306a may be configured to identify through the internet to system 200 (implemented as server 310) all end devices connected in a particular LAN. In some embodiments, the gateway has software downloaded thereon, e.g., a software agent, that allows for communications with the server.

In some embodiments, in step 402, the instructions of LAN management module 214 may cause system 200 (implemented as server 310) to associate one or more groups of LANs (with respective gateways) based on device commonality between LANs. In some embodiments, individual LANs comprising more than one connected device may be grouped into one or more groups, based on device identity.

Figure 3B:
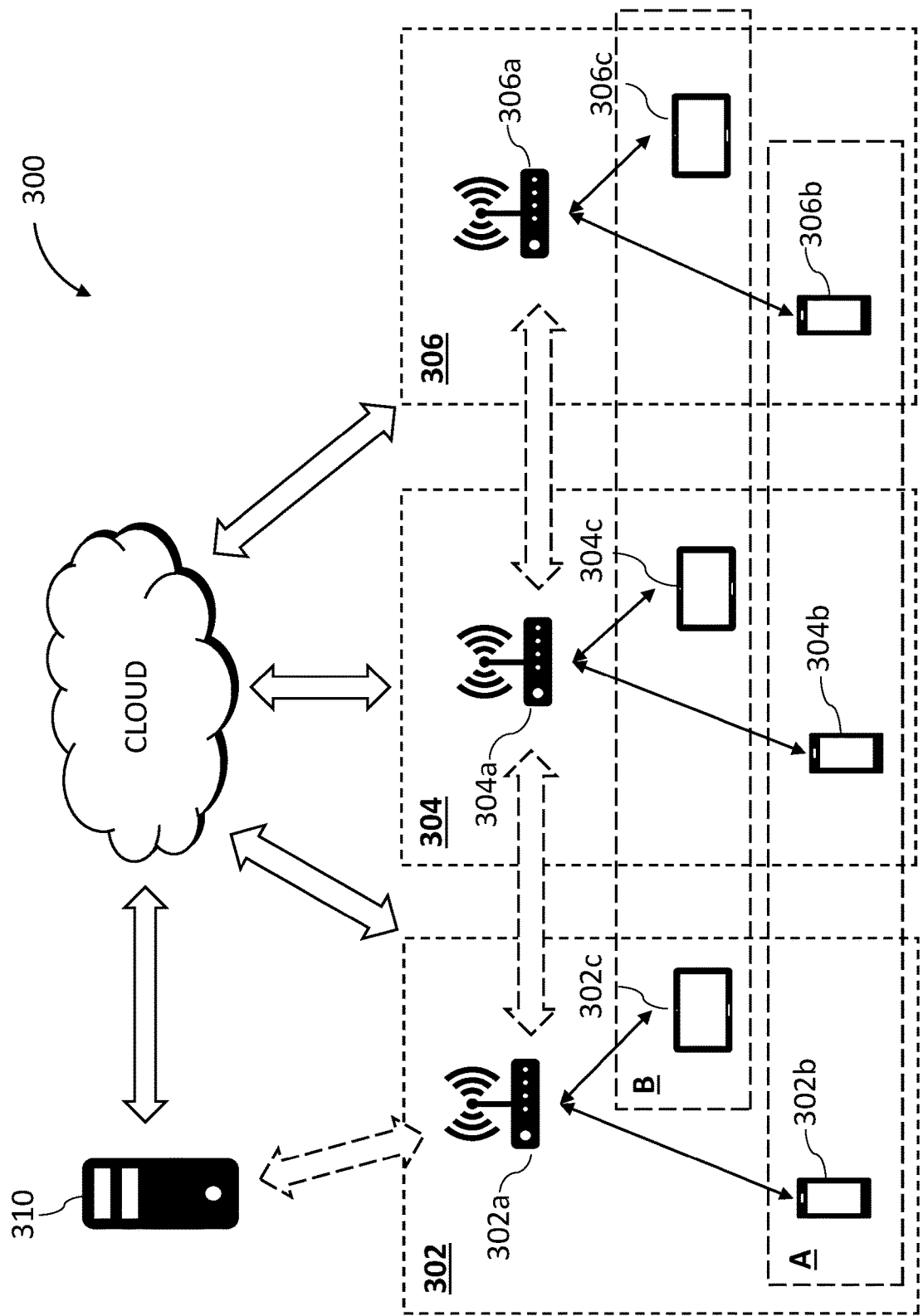

As can be seen in FIG. 3B, for example, a plurality of LANs 302, 304, 306, comprising each, e.g., an iPhone smartphone 302b, 304b, 306b may be grouped together into a first group A. Similarly, a plurality of LANs comprising each an iPad tablet computer 302c, 304c, 306c may be grouped together into a second group B. In some embodiments, for example, LANs 302, 304, 306 which comprise both an iPhone smartphone and an iPad tablet may be associated with both the first and the second groups A and B. In some sssembodiments, each of the groups associated by server 310 has at least 10 LANs associated therewith. In some embodiments, the minimum number of LANs in a group may be lower than 10.

In some embodiments, in step 404, the instructions of LAN management module 214 may cause system 200

(implemented as server 310) to identify to each gateway 302*a*, 304*a*, 306*a* in LANs associated with one or more groups, the identity of other gateways associated with each group. For example, system 200 (implemented as server 310) may identify to gateway 302*a* other group member in group A, i.e., gateways 304*a* and 306*a*. Similarly, system 200 (implemented as server 310) may identify to gateway 304*a* the other group member in group A, i.e., gateways 302*a* and 306*a*, and so on.

In some embodiments, in step 406, as can be seen in FIG. 3B, the instructions of LAN management module 214 may cause system 200 (implemented as server 310) or form a network of LANs, e.g., among all gateways in a defined group. For example, with respect to group A, gateways 302*a*, 304*a*, 306*a* may be assembled into a network according to a client/server model, where system 200 (implemented as server 310) manages network communications. In some embodiments, a network access point within a LAN is a gateway.

In some embodiments, the network may be a peer to peer (P2P) network. In some embodiments, software agents installed on each of gateways 302*a*, 304*a*, 306*a* may be configured to create a P2P network among the gateways. In some embodiments, the P2P network access point within a LAN is a gateway. In some embodiments, once the group of LANs is connected through a P2P network, the P2P network may be self-supported and no longer relies on the server 310 for inter-network communications. In some embodiments, a P2P network is a distributed application system that allows for devices to share and receive information without the need for a central server. Once connected to the P2P, each peer becomes a supplier and a consumer of resources, thus allowing for the protocol presented herein to obtain information about each gateway without the need to communicate with the server directly. In some embodiments, P2P networking requires a software to be installed onto the gateway. In some embodiments, the P2P networking software can be installed, deployed, and/or downloaded from, e.g., system 200 (implemented as server 310) and/or any other vendor and/or source by the ISP and/or by the owner of the gateway.

In some embodiments, a peer to peer network of the present disclosure may be an unstructured peer to peer network, a structured peer to peer network, a hybrid peer to peer network, and/or a centralized peer to peer. In some aspects, each gateway has installed suitable peer to peer software to facilitate communication through a peer to peer network. In some aspects, each gateway may serve as a client or a server to the remaining gateways. In some aspects a peer to peer network of the present disclosure may consist of one or more local area networks connected through their gateways.

In some embodiments, in step 408, the instructions of data traffic monitor 212 may cause system 200 to detect a common download file received by one or more of the gateways within a group, or a subset of the gateways in the group, e.g., gateways 302*a* and 304*a* in group A in FIG. 3B, wherein the common download file may be intended for a device in the respective LAN, and wherein the common download file meets specified criteria to be considered associated with an 'update event.'

In some embodiments, the common download file is received over the internet, using internet protocol (IP) traffic, e.g., transmission control protocol (TCP) or user datagram protocol (UDP). In some embodiments, the common download is intended for deployment to, e.g., add new files, replace existing files with newer revisions, delete obsolete files, and/or a combination of these actions.

Figure 3C:
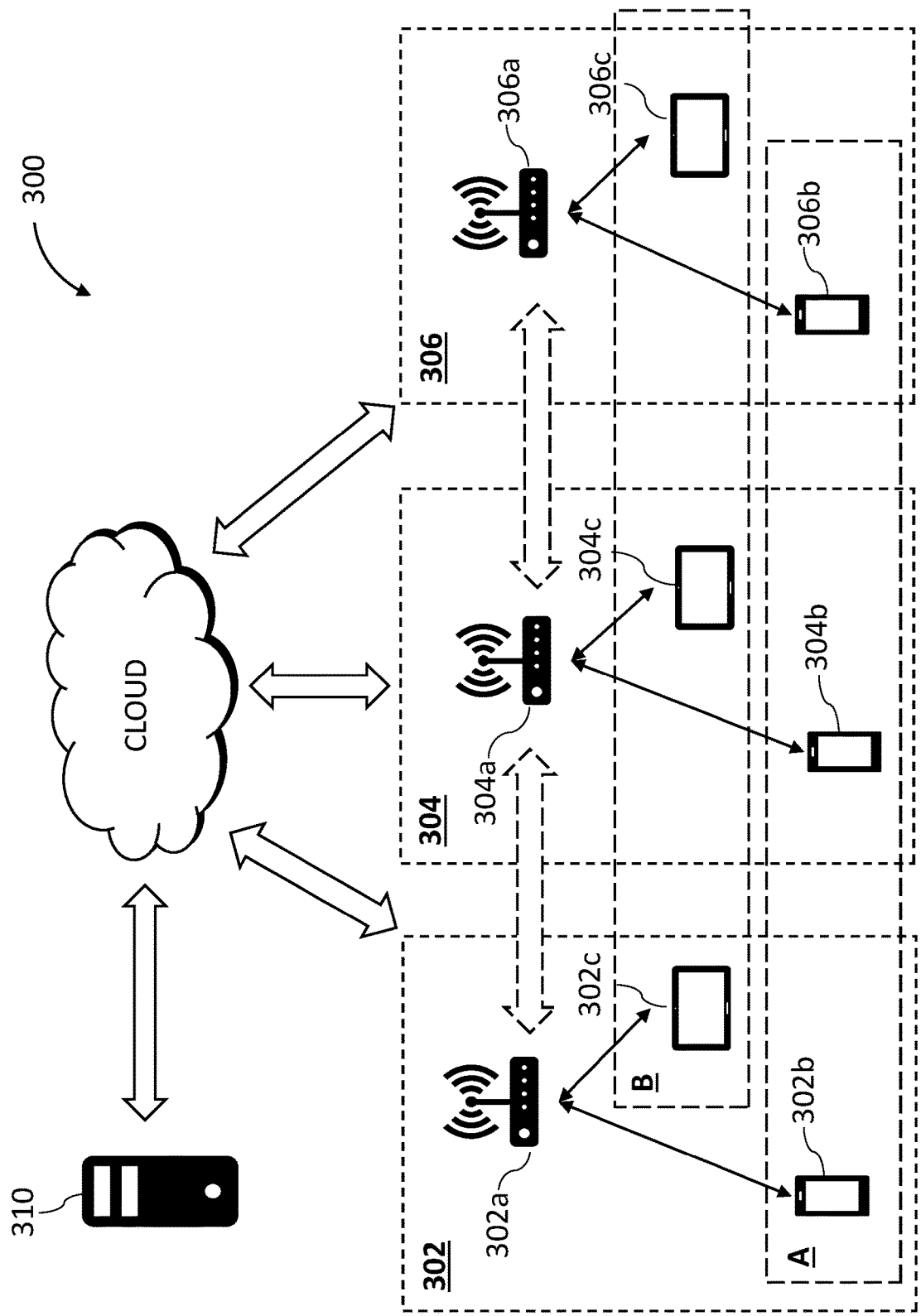

In some embodiments, the instructions of data traffic monitor 212 may cause system 200 to continuously or periodically monitor and sample one or more connections affecting network environment 300 in FIGS. 3A-3C, to determine one or more data traffic parameters. The data traffic parameters may be obtained, e.g., from packet header information (obtained either through operating system files or data traffic sniffing), including, e.g., the IP source, destination, and port numbers. In some embodiments, the present disclosure may employ one or more connection tracking tools (for example, tools intended for use in conjunction with a Linux operating system, such as Iptables and/or Connection Tracking System), to continuously or periodically monitor and sample connections, to determine one or more traffic parameters, measurements and/or statistics of the connection. In some embodiments, such tools provide information about the state of the connection, e.g., the source and destination IP addresses, port number pairs, protocol types, state, and timeout. In some embodiments, such tools may provide such information with respect to application protocols such as FTP, TFTP, IRC, and PPTP. In some embodiments, these stages may be configured to intercept all traffic flows, e.g., outgoing traffic going through the firewall, incoming traffic through the firewall, and outgoing traffic from the firewall.

In some embodiments, the instructions of data traffic monitor 212 may cause system 200 to determine whether the common download file meets specified criteria to be considered associated with an 'update event.'

In some embodiments, system 200 may be configured to perform one or more threshold checks, to rule out potential types of download files which are certain not to be update events. For example, system 200 may be configured to determine whether the common download file represents a shared resource accessed by multiple end devices within the formed ad-hoc network, e.g., a streaming service, e.g., a video streaming service, or a peer-to-peer file sharing service.

In some embodiments, the present disclosure provides for classifying downloaded files within a data traffic session between a source and a plurality of end devices as comprising a streaming service, such as video streaming, news feeds, etc., and/or any other downloading of content or data. This classification may assist in determining whether a common download file comprises an update event. In some embodiments, the present disclosure provides for training a machine learning classifier to perform data traffic classification, to detect data traffic sessions consistent with streaming services. In some embodiments, a trained machine learning model of the present disclosure may be applied, at an inference stage, to classify data traffic captured in real-time, wherein the classification output indicates whether a data flow is a member of one of the streaming service class.

In some embodiments, a machine learning classifier of the present disclosure may be trained on a training dataset comprising a plurality of data traffic parameters collected by network traffic monitor 212, including, but not limited to: data packets in rate, data bytes in rate, data packets out rate, and/or data bytes out rate. In some embodiments, a training dataset of the present disclosure may further comprise statistical features of the data traffic session, based on the determined parameters, e.g., mean, minimum, maximum, variance, and/or distribution with respect to each parameter. In some embodiments, further training features may include data session duration, data session throughput, data session 'on' and 'off' durations, data session on/off ratio, and/or packet arrival times and duration between packet arrivals within the session. In some embodiments, the present disclosure provides for classifying a data traffic session as a streaming session based, at least in part, on a decision tree configured to perform a classification task based on the obtained data traffic parameters and/or features, as well as additional metric, such as Gini impurity.

In some embodiments, the present disclosure provides for detecting a common download file as part of a peer-to-peer file sharing service, e.g., when many connections are sent to unknown ports in UDP. In some embodiments, the instructions of network traffic monitor 212 may cause system 200 to send out a torrent probe packet throughout the ad-hoc network, to verify whether the download files are part of a peer-to-peer file sharing service.

In some embodiments, system 200 may be then configured to evaluate and score the common download file based, at least in part, on the following parameters:

File size: Whether the common download file meets minimum file size parameters, e.g., at least 5 mb, and/or a file size range parameters, e.g., between 2 mb and 10 mb.

File type: Whether the common download file is of a specified type of download file (e.g., executable file, audio file, video file, image file).

Download time: Time of day of the download. For example, a common download file received during nighttime may indicate a greater likelihood that the common download file is an update event.

Encryption status: Whether the download file is encrypted or not.

Security indicators: Whether the download file has a digital certificate or a digital signature.

Number of devices affected: The total number of devices which received the common download file. The larger the number, the greater is the likelihood that the common download file is an update event affecting all like devices. In some embodiments, this may be performed by, e.g., one or more of the receiving gateways within a network, e.g., gateways 302a, 304a in group A, which may query all other gateways in the group to determine a total number of gateways which received the same download file. Thus, receiving a file appearing to be a software update, the gateways issue a query within the network for gateways that have received a similar file. In some embodiments, any TCP and/or UDP session received by a gateway that exceeds a specified size threshold will trigger the query of the network. In some embodiments, for each TCP and/or UDP session the gateway creates a unique hash value, in order to easily identify the file. In some embodiments, the hash value is stored in a cache for a specified amount of time, e.g., 24 hours.

Type of devices affected: The categories or types of devices receiving the common download file. For example, if all affected devices are of the same type and model (e.g., an Apple iPhone), the likelihood that the common download file is an update event affecting all like devices increases. Conversely, when devices of various types and/or models receive the common download file, the likelihood that the common download file is an update event affecting all like devices decreases.

Reboot event: Whether the relevant end-devices experience a 'reboot' event within a specified time (e.g., 24 hours) after detecting the download file. For example, if the relevant device disconnects and reconnects to its respective LAN within a specified time (e.g., 24 hours) after detecting the download file, which may be an indication of a reboot event.

Domain name: whether the domain name from which the common download file is received contains an indication associated with the type of end device. for example, whether the domain name contains an indication of the device manufacturer name, device brand name, and/or device model name.

IP address parameters: Statistical analysis of download parameters from an IP address associated with a common download file, e.g., mean, minimum, maximum, variance, and/or distribution of downloaded files count and/or sizes. For example, a detected "peak" in a download count of files of a specified size and/or within a specified size range, from a server over a given timer period may indicate an increase in the likelihood that the common download file is an update event. Conversely, when no increase in download count and/or file sizes from a server over a given timer period may indicate that the likelihood that the common download file is an update event in decreased.

In some embodiments, a reboot event may affect at least some of the devices in a group, e.g., group A in FIG. 3B. In some embodiments, each gateway in the group may detect a reboot event of devices within the group, e.g., a device may be offline for a specified duration within a certain period of time after a download file is detected. For example, a device may be offline for between 3 minutes to 1 hour within 24 hours of receiving a download file. Such criteria may indicate a reboot event affecting the device in conjunction with an update event of the device.

In some embodiments, each receiving gateway 302a, 304a may create a download file hash identifier comprising, e.g., file size and the domain from which it was downloaded, e.g.:

HASH(domain_name+total_download_size).

In some embodiments, the hash is generated using a secure, non-reversible hash function, such as SHA256. In some embodiments, a download file hash may comprise additional and/or other data and/or identifiers. In some embodiments, other and/or additional identification and/or hashing method may be used to assign an identifier to the download file.

In some embodiments, system 200 may store information with respect to all downloaded files for a specified period of time (e.g., 24 hours, 48 hours, one week, one month, etc.) to enable late verification of an update event with respect the present a connected device.

In some embodiments, in step 410, system 200 may be configured to assign a score to the common download file based on the parameters listed above, which indicates the level of confidence or likelihood that the common download file is indeed associated with an update event.

In some embodiments, in step 412, when the query returns a total number of gateways which received the same download file exceeding a specified threshold (e.g., at least 10), it may be determined that the download file is associated with an update event affecting devices within the group, e.g., devices 302b, 304b, 306b in group A. In some embodiments, upon such determinations, all gateways in the network and/or system 200 (implemented as server 310) may be notified accordingly, e.g., by one or more of the gateway/LANs in the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a LAN, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
at least one hardware processor; and
a non-transitory computer-readable storage medium having stored thereon program instructions, the program instructions executable by the at least one hardware processor to:
identify, by a cloud server, a set of gateway devices to one another, wherein said set of gateway devices is associated with a corresponding set of local area networks (LANs) associated with said cloud server, based, at least in part, on a similarity parameter with respect to a respective end device connected within each of said LANs,
form a communications network comprising a subset of said gateway devices, when said gateway devices in said subset detect a download file received by said respective end devices in each of said corresponding LANs associated with said subset,
calculate an update event likelihood score with respect to said download file, based, at least in part, on a plurality of parameters associated with said download file, wherein said plurality of parameters are communicated over said communications network, and
issue a notification that said download file is associated with an update event affecting all of said end devices in each of said LANs, when said update event likelihood score exceeds a specified threshold.

2. The system of claim 1, wherein said program instructions are further executable to determine that said download file is not associated with an update event, based, at least in part, on detecting that said download file is part of: a streaming service, and a peer-to-peer file sharing service.

3. The system of claim 1, wherein said plurality of parameters comprise: a size of said download file; a type of said download file; a time of day of said receiving by said respective end devices; an encryption status of said download file; the presence of a digital certificate and server identify associated therewith or a digital signature associated with said download file; a number of said respective end devices which received said download file; a degree of similarity among all of said end devices which received said download file; a reboot event experienced by at least some of said respective end devices which received said download file; a domain name of a source form which said download file is received; at least one of mean, minimum, maximum, variance, and distribution of the number of downloaded files received from a specified IP address; and at least one of mean, minimum, maximum, variance, and distribution of the sizes of downloaded files received from a specified IP address.

4. The system of claim 1, wherein said similarity parameter is at least one of: end device type; end device model; end device manufacturer; end device product version; end device build version; one or more end device components; one or more end device sub-components; an installed software on said end device or a specified version thereof; an operating system of said end device or a specified version thereof; a firmware of said end device or a specified version thereof; one or more end device user attributes; and end device geographic location.

5. The system of claim 1, wherein said forming, detecting, calculating, and issuing are performed by at least one of said respective gateway devices in said subset.

6. The system of claim 1, wherein said communications network includes said cloud server, and wherein said calculating and issuing are performed by said cloud server.

7. The system of claim 1, wherein said update event comprises a set of changes to a computer program residing on said end device.

8. A computer-implemented method comprising:
identifying, by a cloud server, a set of gateway devices to one another, wherein said set of gateway devices is associated with a set of corresponding local area networks (LANs) associated with said cloud server, based, at least in part, on a similarity parameter with respect to a respective end device connected within each of said LANs;
forming a communications network comprising a subset of said gateway devices, when said gateway devices in said subset detect a download file received by said respective end devices in each of said corresponding LANs associated with said subset;
calculating an update event likelihood score with respect to said download file, based, at least in part, on a plurality of parameters associated with said download file, wherein said plurality of parameters are communicated over said communication network; and
issuing a notification that said download file is associated with an update event affecting all of said end devices in each of said LANs, when said update event likelihood score exceeds a specified threshold.

9. The computer-implemented method of claim 8, further comprising determining that said download file is not associated with an update event, based, at least in part, on detecting that said download file is part of: a streaming service, and a peer-to-peer file sharing service.

10. The computer-implemented method of claim 8, wherein said plurality of parameters comprise: a size of said download file; a type of said download file; a time of day of said receiving by said respective end devices; an encryption status of said download file; the presence of a digital certificate and server identify associated therewith or a digital signature associated with said download file; a number of said respective end devices which received said download file; a degree of similarity among all of said end devices which received said download file; a reboot event experienced by at least some of said respective end devices which received said download file; a domain name of a source form which said download file is received; at least one of mean, minimum, maximum, variance, and distribution of the number of downloaded files received from a specified IP address; and at least one of mean, minimum, maximum, variance, and distribution of the sizes of downloaded files received from a specified IP address.

11. The computer-implemented method of claim 8, wherein said similarity parameter is at least one of: end device type; end device model; end device manufacturer; end device product version; end device build version; one or more end device components; one or more end device sub-components; an installed software on said end device or a specified version thereof; an operating system of said end device or a specified version thereof; a firmware of said end device or a specified version thereof; one or more end device user attributes; and end device geographic location.

12. The computer-implemented method of claim 8, wherein said forming, detecting, calculating, and issuing are performed by said respective gateway devices in said subset.

13. The computer-implemented method of claim 8, wherein said communications network includes said cloud server, and wherein said calculating and issuing are performed by said cloud server.

14. The computer-implemented method of claim 8, wherein said update event comprises a set of changes to a computer program residing on said end device.

15. A computer program product comprising a non-transitory computer-readable storage medium having program instructions embodied therewith, the program instructions executable by at least one hardware processor to:
identify, by a cloud server, a set of gateway devices to one another, wherein said set of gateway devices is associated with a corresponding set of local area networks (LANs) associated with said cloud server, based, at least in part, on a similarity parameter with respect to a respective end device connected within each of said LANs;
form a communications network comprising a subset of said gateway devices, when said gateway devices in said subset detect a download file received by said respective end devices in each of said corresponding LANs associated with said subset;
calculate an update event likelihood score with respect to said download file, based, at least in part, on a plurality of parameters associated with said download file; and
issue a notification that said download file is associated with an update event affecting all of said end devices in each of said LANs, when said update event likelihood score exceeds a specified threshold.

16. The computer program product of claim 15, wherein said program instructions are further executable to determine that said download file is not associated with an update event, based, at least in part, on detecting that said download file is part of: a streaming service, and a peer-to-peer file sharing service.

17. The computer program product of claim 15, wherein said plurality of parameters comprise: a size of said download file; a type of said download file; a time of day of said receiving by said respective end devices; an encryption status of said download file; the presence of a digital certificate and server identify associated therewith or a digital signature associated with said download file; a number of said respective end devices which received said download file; a degree of similarity among all of said end devices which received said download file; a reboot event experienced by at least some of said respective end devices which received said download file; a domain name of a source form which said download file is received; at least one of mean, minimum, maximum, variance, and distribution of the number of downloaded files received from a specified IP address; and at least one of mean, minimum, maximum, variance, and distribution of the sizes of downloaded files received from a specified IP address.

18. The computer program product of claim 15, wherein said similarity parameter is at least one of: end device type; end device model; end device manufacturer; end device product version; end device build version; one or more end device components; one or more end device sub-components; an installed software on said end device or a specified version thereof; an operating system of said end device or a specified version thereof; a firmware of said end device or a specified version thereof; one or more end device user attributes; and end device geographic location.

19. The computer program product of claim 15, wherein said forming, detecting, calculating, and issuing are performed by at least one of said respective gateway devices in said sub set.

20. The computer program product of claim 15, wherein said communications network includes said cloud server, and wherein said calculating and issuing are performed by said cloud server.

* * * * *